(12) United States Patent
Webb et al.

(10) Patent No.: US 9,913,237 B2
(45) Date of Patent: Mar. 6, 2018

(54) PRESENCE INDICATION IN A WIRELESS COMMUNICATION SYSTEM

(71) Applicant: FUJITSU LIMITED, Kawasaki-shi, Kanagawa (JP)

(72) Inventors: Matthew Webb, London (GB); Timothy Moulsley, Caterham Surrey (GB); Yiwei Fang, High Wycombe (GB)

(73) Assignee: FUJITSU LIMITED, Kawasaki (JP)

( * ) Notice: Subject to any disclaimer, the term of this patent is extended or adjusted under 35 U.S.C. 154(b) by 20 days.

(21) Appl. No.: 14/444,430

(22) Filed: Jul. 28, 2014

(65) Prior Publication Data

US 2014/0349645 A1 Nov. 27, 2014

Related U.S. Application Data

(63) Continuation of application No. PCT/EP2012/055442, filed on Mar. 27, 2012.

(51) Int. Cl.
*H04W 4/00* (2009.01)
*H04W 60/02* (2009.01)
(Continued)

(52) U.S. Cl.
CPC ............ *H04W 60/02* (2013.01); *H04L 5/0035* (2013.01); *H04L 5/0091* (2013.01); *H04W 8/005* (2013.01);
(Continued)

(58) Field of Classification Search
None
See application file for complete search history.

(56) References Cited

U.S. PATENT DOCUMENTS 7,502,623 B2 3/2009 Laroia et al.
9,565,713 B2 2/2017 Maeda et al.
(Continued)

FOREIGN PATENT DOCUMENTS

CN 101873661 A 10/2010
JP 2009-296244 A 12/2009
(Continued)

OTHER PUBLICATIONS

Notice of Preliminary Rejection issued for corresponding Korean Patent Application No. 10-2014-7021104 dated Jun. 25, 2015 with an English translation.
"3rd Generation Partnership Project; Technical Specification Group Radio Access Network; Evolved Universal Terrestrial Radio Access (E-UTRA); Medium Access Control (MAC) protocol specification (Release 10)," 3GPP TS 36.321 V10.5.0 (Mar. 2012).
(Continued)

*Primary Examiner* — German J Viana Di Prisco
(74) *Attorney, Agent, or Firm* — Myers Wolin, LLC (57) ABSTRACT

Embodiments of the present invention provide a new way for a UE to autonomously indicate to the network from which transmission points (TPs) it is able to receive certain broadcast signals. As an example, by receiving in a broadcast signal in the form of a synchronization sequence, the physical identity of a particular TP, a UE infers when it should, if it wishes, send on an UL an indication of its ability to receive the broadcast signal from that TP—i.e., an indication of its presence in the coverage of the TP. The network is then able to take suitable action in response to this, such as adjusting network coverage, enabling or disabling other broadcast channels and controlling paging.

14 Claims, 6 Drawing Sheets

(51) Int. Cl.
*H04W 52/02* (2009.01)
*H04W 8/00* (2009.01)
*H04L 5/00* (2006.01)
*H04B 7/022* (2017.01)
*H04W 48/10* (2009.01)

(52) U.S. Cl.
CPC ......... *H04W 52/0206* (2013.01); *H04B 7/022* (2013.01); *H04L 5/0007* (2013.01); *H04W 48/10* (2013.01)

(56) References Cited

U.S. PATENT DOCUMENTS

| | | | | |
|---|---|---|---|---|
| 2011/0268077 | A1* | 11/2011 | Wan | H04J 11/0053 370/329 |
| 2012/0108238 | A1* | 5/2012 | Kim | H04W 48/08 455/435.1 |
| 2012/0147773 | A1* | 6/2012 | Kim | H04L 1/0025 370/252 |
| 2012/0201163 | A1* | 8/2012 | Jongren | H04W 24/10 370/252 |
| 2012/0213109 | A1* | 8/2012 | Xu | H04B 7/024 370/252 |
| 2013/0114428 | A1* | 5/2013 | Koivisto | H04B 7/024 370/252 |
| 2014/0064201 | A1* | 3/2014 | Zhu | H04L 5/0094 370/329 |
| 2014/0295905 | A1* | 10/2014 | Koskinen | H04W 52/0206 455/522 |
| 2015/0009898 | A1* | 1/2015 | Rosa | H04L 5/0048 370/328 |

FOREIGN PATENT DOCUMENTS

| | | |
|---|---|---|
| JP | 2011-49859 A | 3/2011 |
| JP | 2011-91748 A | 5/2011 |
| JP | 2011-223622 A | 11/2011 |
| WO | 2008131588 A1 | 11/2008 |
| WO | 2009140988 A1 | 11/2009 |
| WO | 2010002991 A1 | 1/2010 |
| WO | 2010110568 A2 | 9/2010 |
| WO | 2011012087 A1 | 2/2011 |
| WO | 2011/099513 A1 | 8/2011 |
| WO | 2011138351 A1 | 11/2011 |
| WO | 2013044970 A1 | 4/2013 |
| WO | 2013110331 A1 | 8/2013 |
| WO | 2013113361 A1 | 8/2013 |
| WO | 2013143580 A1 | 10/2013 |

OTHER PUBLICATIONS

Mediatek, "Discussion on the Support of Downlink Physical Channels in CoMP Scenario 4", Agenda Item: 6.3.1.3, 3GPP TSG-RAN WG1 #65, R1-111784, Bacelona, Spain, May 9-13, 2011.
Alcatel-Lucent et al., "On the need for RACH Enhancement for UL CoMP," 3GPP TSG RAN WG1 Meeting #68bis, R1-121250, Jeju, Korea, Mar. 26-30, 2012.
International search report issued for corresponding international application No. PCT/EP2012/055442, dated Oct. 24, 2012.
Daewon Lee et al; "Coordinated Multipoint Transmission and Reception in LTE-Advanced: Deployment Scenarios and Operational Challenges"; IEEE Communications Magazine, IEEE Service Center, Piscataway, NJ, US; vol. 50, No. 2, pp. 148-155; Feb. 1, 2012.
ETSI TS 136 211 V8.7.0; LTE; Evolved Universal Terrestrial Radio Access (E-UTRA); "Physical channels and modulation (3GPP TS 36.211 version 8.7.0 Release 8)"; Jun. 2009.
Mitsubishi Electric; "Dynamic Setup of HNBs for Energy Savings and Interference Reduction"; Agenda Item: 10.1.1c; 3GPP TSG RAN WG3 Meeting #61; R3-081949; Jeju Island, Korea; Aug. 18-22, 2008. 3GPP.
Motorola Mobility; "Coordinated Scheduling (CS) Schemes with Low Power RRH: Details and Phase-2 Evaluations Results"; Agenda Item: 6.5.1; 3GPP TSG RAN1 #66; R1-112441; Athens, Greece; Aug. 22-26, 2011.
Motorola Mobility; "Standardization Impact of CoMP Coordinated Scheduling Schemes"; Agenda Item: 6.5.2; 3GPP TSG RAN1 #66; R1-112442; Athens, Greece; Aug. 22-26, 2011.
Renesas Mobile Europe Ltd.; "Enhancement of proximity indication in heterogeneous networks"; Agenda Item: 7.9; 3GPP TSG-RAN WG2 Meeting #75bis; R2-115139; Zhuhai, China; Oct. 10-14, 2011.
Samsung; "CoMP Feedback including preferred-TP indicator"; Agenda Item: 7.5.1.2; 3GPP TSG RAN WG1 #68bis; R1-121622; Jeju, Korea; Mar. 26-30, 2012.
Notice of Reason(s) for Rejection issued for corresponding Japanese Patent Application No. 2015-502106 dated Jan. 26, 2016 with an English translation.
First Notification of Office Action issued by the State Intellectual Property Office of China for corresponding Chinese Patent Application No. 201280066016.1, dated Jul. 6, 2016, with an English translation.
Notification of Reasons for Refusal issued by the Japan Patent Office for corresponding Japanese Patent Application No. 2016-118602, dated Aug. 1, 2017, with an English translation.

\* cited by examiner

PRESENCE INDICATION IN A WIRELESS COMMUNICATION SYSTEM

CROSS-REFERENCE TO RELATED APPLICATIONS

This is a continuation of International Application No. PCT/EP2012/055442, filed on Mar. 27, 2012, the contents of which are herein wholly incorporated by reference.

FIELD OF THE INVENTION

The present invention relates to wireless communication systems, for example systems compliant with the 3GPP Long Term Evolution (LTE) and 3GPP LTE-A (LTE-Advanced) groups of standards, and more particularly to presence indication of user equipments employed in such systems.

BACKGROUND OF THE INVENTION

Wireless communication systems are widely known in which base stations (BSs) communicate with user equipments (UEs) (also called terminals, or subscriber or mobile stations) within range of the BSs.

The geographical area covered by one or more base stations is generally referred to as a cell, and typically many BSs are provided in appropriate locations so as to form a network covering a wide geographical area more or less seamlessly with adjacent and/or overlapping cells. (In this specification, the terms "system" and "network" are used synonymously). Each BS divides its available bandwidth into individual resource allocations for the user equipments which it serves. The user equipments are generally mobile and therefore may move among the cells, prompting a need for handovers between the base stations of adjacent cells. A user equipment may be in range of (i.e. able to detect signals from) several cells at the same time, and it is possible for one cell to be wholly contained within a larger cell, but in the simplest case the UE communicates with one "serving" cell.

The direction of communication from the base station to the UE is referred to as the downlink (DL), and that from the UE to the base station as the uplink (UL). Two well-known transmission modes for a wireless communication system are TDD (Time Division Duplexing), in which downlink and uplink transmissions occur on the same carrier frequency and are separated in time, and FDD (Frequency Division Duplexing) in which transmission occurs simultaneously on DL and UL using different carrier frequencies.

Figure 1:
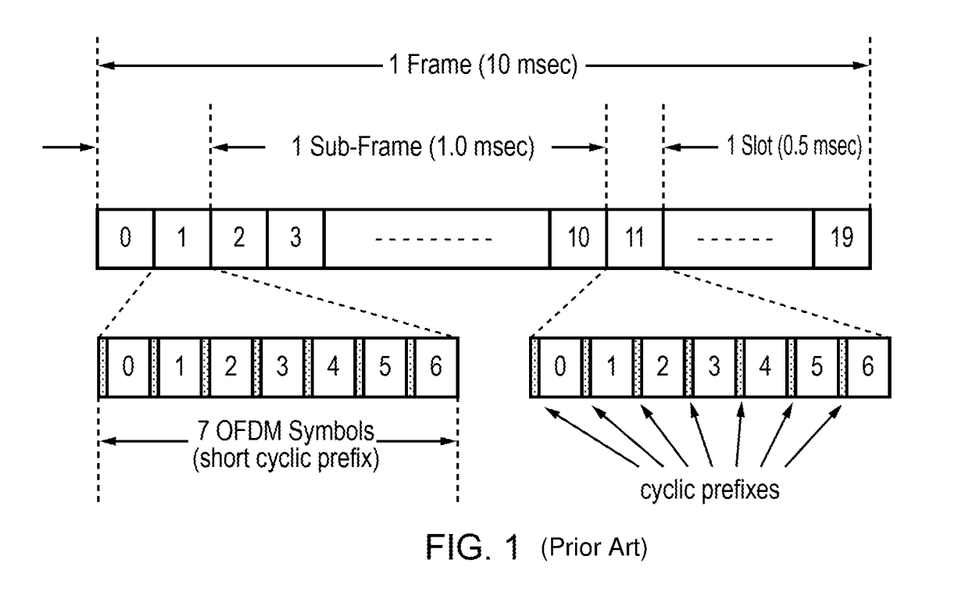
FIG. 1 illustrates a generic frame structure used in LTE.

Resources in such a system have both a time dimension and a frequency dimension. In LTE, the time dimension has units of a symbol time or "slot" (where a "slot" has typically a duration of seven symbol times), as indicated in FIG. 1. The resources in the time domain are further organised in units of frames, each having a plurality of "subframes". Frames follow successively one immediately after the other, and each is given a system frame number (SFN).

In one frame structure for LTE, the 10 ms frame is divided into 20 equally sized slots of 0.5 ms as illustrated in FIG. 1. A sub-frame consists of two consecutive slots, so one radio frame contains 10 sub-frames. An FDD frame consists of 10 uplink subframes and 10 downlink subframes occurring simultaneously. In TDD, the 10 subframes are shared between UL and DL and various allocations of subframes to downlink and uplink are possible, depending on the load conditions. Subframes may consequently be referred to as uplink subframes or downlink subframes.

Meanwhile the frequency dimension is divided in units of subcarriers. The UEs are allocated, by a scheduling function at the BS, a specific number of subcarriers for a predetermined amount of time. Such allocations typically apply to each subframe. Resources are allocated to UEs both for downlink and uplink transmission (i.e. for both downlink subframes and uplink subframes).

Figure 2:
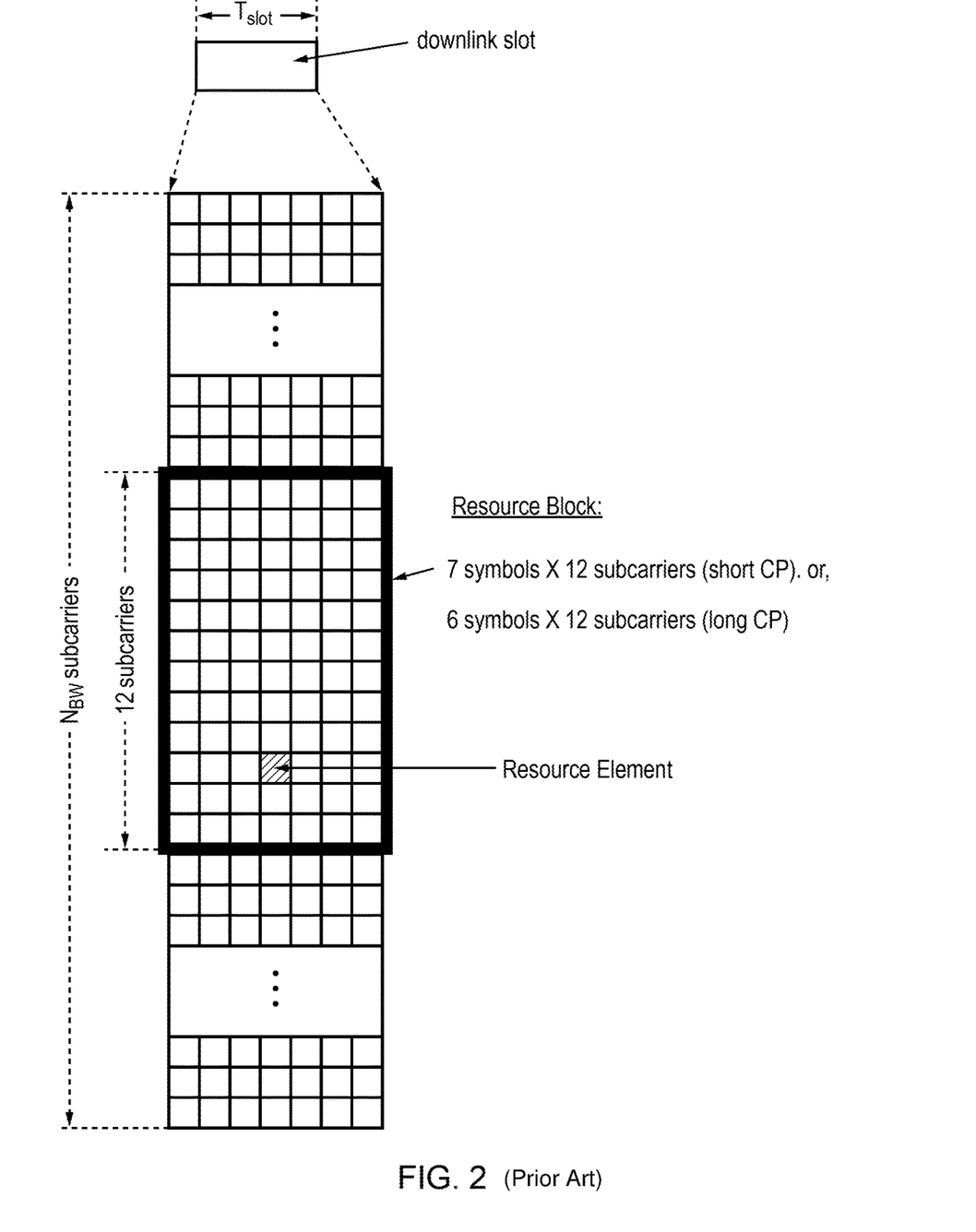
FIG. 2 illustrates resource blocks (RBs) and resource elements (REs) in a downlink subframe.

The transmitted signal in each slot is described by a resource grid of sub-carriers and available OFDM (Orthogonal Frequency-Division Multiplexing) symbols, as shown in FIG. 2. Each element in the resource grid is called a resource element, and each resource element corresponds to one symbol. Each downlink slot has a duration $T_{slot}$ with either 7 or 6 symbols per slot, depending on whether a short or long cyclic prefix (CP) is used. There are a total of $N_{BW}$ subcarriers in the frequency domain, the value of this number depending on the system bandwidth. A block of 12 subcarriers×7 or 6 symbols is called a Resource Block. The Resource Block is the basic unit of scheduling for allocation of resources in the UEs.

A base station typically has multiple antennas and consequently can transmit (or receive) multiple streams of data simultaneously. Physical antennas controlled by the same base station may be widely geographically separated, but need not be so. A group of physical antennas which provides a logically distinct communication path to a UE is termed an antenna port (and may also be considered to be a virtual antenna). Antenna ports may comprise any number of physical antennas. Various transmission modes are possible via the antenna ports, including (in LTE-A) a "transmission mode 9" for closed-loop multiple-input, multiple-output (MIMO). A subset of the physical antennas, which are all in the same geographical location, may be regarded as a distinct transmission point (TP) under control of the same base station. There is generally a fixed relationship between the TPs and cells: each TP may define a distinct cell in the network, but need not do so. References in the remainder of this specification to "base station" apply also to an individual TP unless the context demands otherwise.

Figure 3:
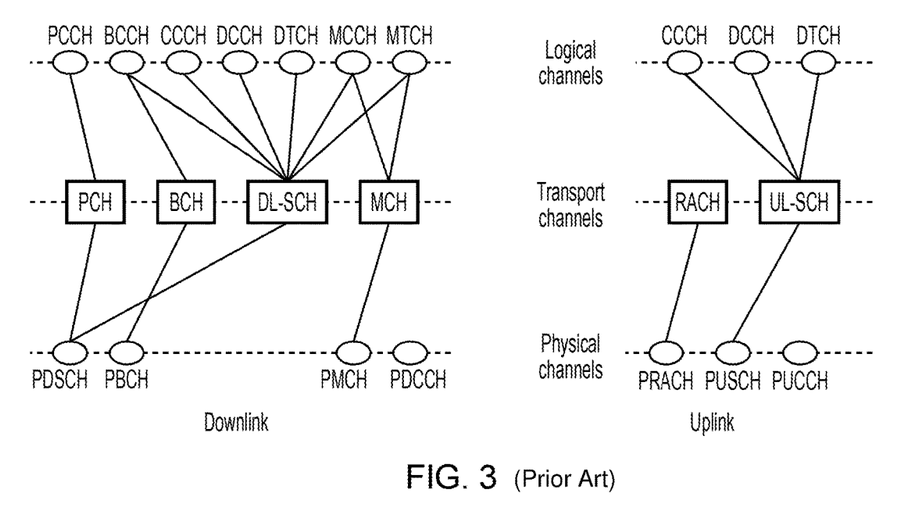
FIG. 3 shows the mapping between logical channels, transport channels and physical channels in LTE.

Several "channels" for data and signalling are defined at various levels of abstraction within the network. FIG. 3 shows some of the channels defined in LTE at each of a logical level, transport layer level and physical layer level, and the mappings between them.

At the physical layer level, on the downlink, user data as well as System Information Blocks (SIBs) are contained in a transport channel DL-SCH, carried on the Physical Downlink Shared Channel (PDSCH). As can be seen from FIG. 3, PDSCH also carries a paging channel PCH at the transport layer level. There are various control channels on the downlink, which carry signalling for various purposes; in particular the Physical Downlink Control Channel, PDCCH, is used to carry, for example, scheduling information from a base station (called eNodeB in LTE) to individual UEs being served by that base station. The PDCCH is located in the first OFDM symbols of a slot.

Each base station broadcasts a number of channels and signals to all UEs within range, whether or not the UE is currently being served by that cell. Of particular interest for present purposes, these include a Physical Broadcast Channel PBCH as shown in FIG. 3, as well as (not shown) a Primary Synchronization Signal PSS and Secondary Synchronization Signal SSS, described in more detail below. PBCH carries a so-called Master Information Block (MIB), which gives, to any UEs within range of the signal, basic information including system bandwidth, number of transmit antenna ports, and system frame number. Reading the MIB enables the UE to receive and decode the SIBs referred to earlier.

Meanwhile, on the uplink, user data and also some signalling data is carried on the Physical Uplink Shared Channel (PUSCH), and control channels include a Physical Uplink Control Channel, PUCCH, used to carry signalling from UEs including channel quality indication (CQI) reports and scheduling requests.

Figure 4:
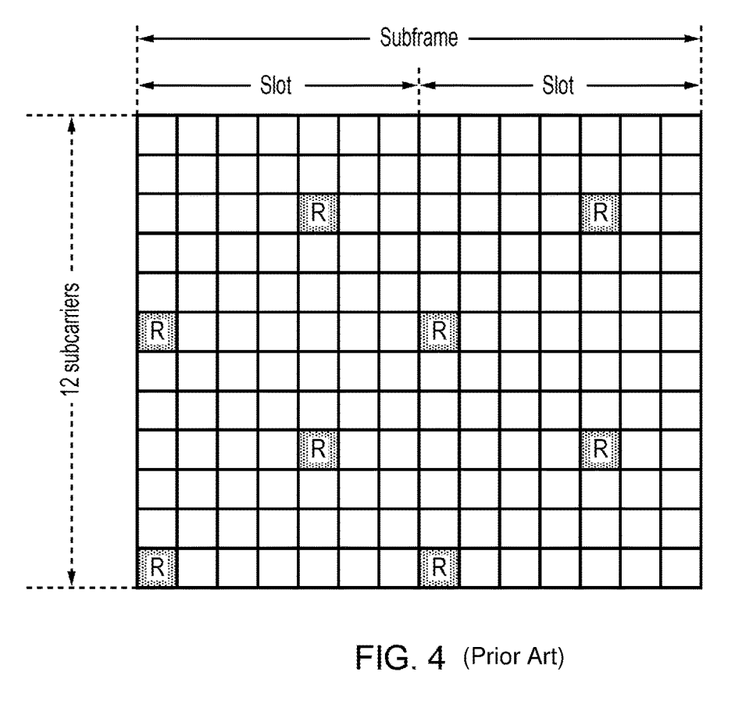
FIG. 4 shows one pattern of insertion of reference signals within a downlink subframe.

The above "channels" defined for various data and signalling purposes, should not be confused with the "channel" in the sense of the radio link between a UE and its serving base station(s), which is subject to fading and interference. To facilitate measurements of the channel by UEs, the base station inserts reference signals in the resource blocks as shown, for example, in FIG. 4. FIG. 4 shows the downlink reference signal structure for single antenna port transmission. As can be seen, one subframe has reference signals, denoted R, inserted at intervals within individual REs. Various kinds of reference signal are possible, and the reference signal structure or pattern varies when more antenna ports are in use.

In LTE (as distinct from LTE-A), downlink reference signals can be classified into a cell-specific (or common) reference signal (CRS), an MBSFN reference signal used in MBMS (not relevant for present purposes), and user equipment-specific reference signals (UE-specific RS, also referred to as demodulation reference signals, DM-RS). There is also a positioning reference signal.

The CRS is transmitted to all the UEs within a cell and used for channel estimation. The reference signal sequence carries the cell identity. Cell-specific frequency shifts are applied when mapping the reference signal sequence to the subcarriers. A UE-specific reference signal is received by a specific UE or a specific UE group within a cell. UE-specific reference signals are chiefly used by a specific UE or a specific UE group for the purpose of data demodulation.

CRSs are transmitted in all downlink subframes in a cell supporting non-MBSFN transmission, and can be accessed by all the UEs within the cell covered by the eNodeB, regardless of the specific time/frequency resource allocated to the UEs. They are used by UEs to measure properties of the radio channel—so-called channel state information or CSI. Meanwhile, DM-RSs are transmitted by the eNodeB only within certain resource blocks that only a subset of UEs in the cell are allocated to receive.

Starting with Release 10 of the specifications, LTE is referred to as LTE-Advanced (LTE-A). A new reference signal in LTE-A is a Channel State Information Reference Signal (CSI-RS). To minimise interference, CSI-RS is only transmitted once every several subframes. In the Release 10 specifications, configurations of CSI-RS patterns are defined for 1, 2, 4 or 8 antenna ports. Their purpose is to allow improved estimation of the channel for more than one cell for feeding back channel quality information and possibly other related parameters to the network (compared with using CRS). CSI-RS patterns in time and frequency can be configured by higher layers to allow considerable flexibility over which resource elements (REs) contain them.

A UE compliant with LTE Release 10 can be configured with multiple CSI-RS patterns specific to its serving cell:
   one configuration for which the UE shall assume non-zero transmission power for the CSI-RS; and
   zero or more configurations for which the UE shall assume zero transmission power.

The purpose of the 'zero power CSI-RS patterns' is to ensure that a cell so configured can safely be assumed by the UE to not transmit in the REs which will contain CSI-RS of the cells it is cooperating with. Knowledge of the presence of zero power CSI-RS patterns can be used by a Release 10 UE to mitigate their possible impact on data transmissions using PDSCH.

Reference signals are also defined on the uplink, in particular a Sounding Reference Signal (SRS) transmitted by the UE, which provides channel information to the eNodeB.

A UE receives two SRS configurations from the network via RRC signalling. One is a UE-specific SRS configuration which details periodicity, offset, transmission comb index, frequency domain position and frequency hopping pattern of SRS transmissions. SRS are always transmitted in the last OFDM symbol of a subframe where they occur. There is also a cell-specific SRS configuration to indicate to all UEs when and where SRS may occur so that the UEs can stop PUSCH transmissions in all relevant frequency and time domain resources. In LTE Rel-10, SRS may be periodic according to the configuration or aperiodic (triggered by the network via DL signalling).

Figure 5A:
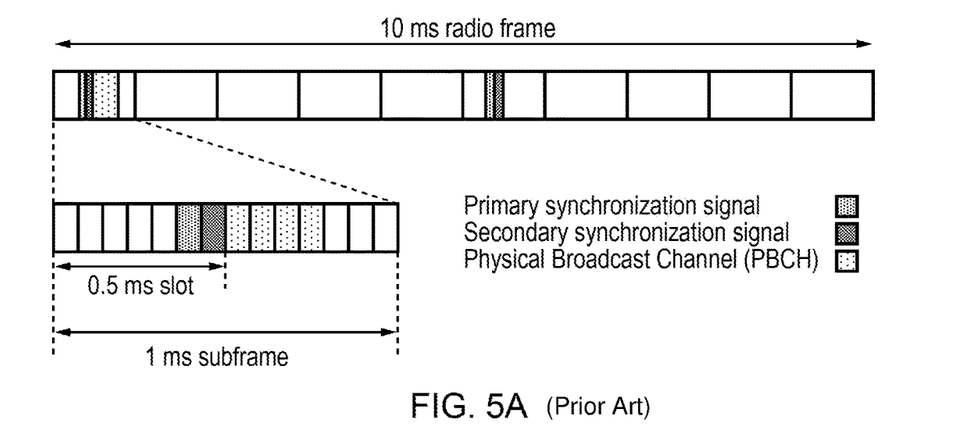
FIG. 5A shows slot and subframe allocation of synchronization signals and a broadcast channel in the case of an FDD-based LTE system.
Figure 5B:
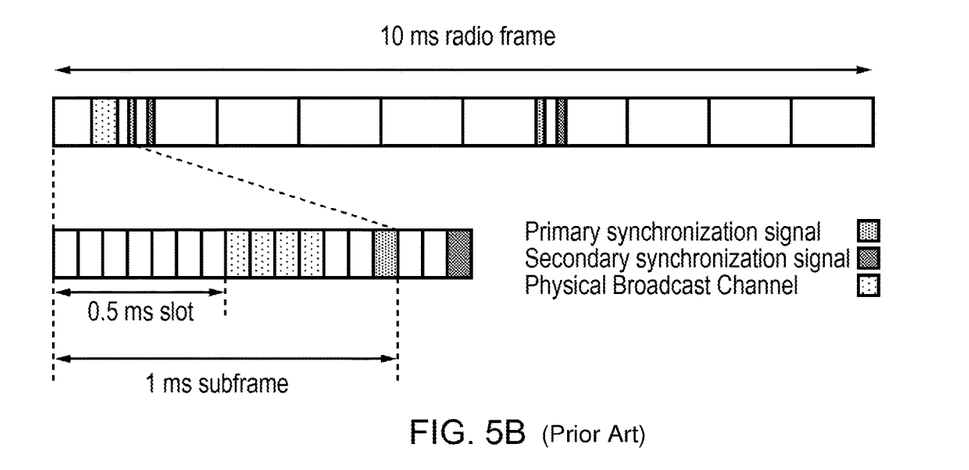
FIG. 5B shows slot and subframe allocation of synchronization signals and a broadcast channel in the case of a TDD-based LTE system.

A UE must successfully perform a cell search procedure and obtain synchronization with a cell before communicating with the network. Each cell is identified by a physical layer cell identity (PCI), 504 of which are defined in LTE. These are arranged hierarchically in 168 unique cell layer identity groups each containing three physical layer identities. To carry the physical layer identity and the physical layer cell identity group, two signals are provided: the primary and secondary synchronization signals (PSS and SSS). Specified in 3GPP TS36.211, hereby incorporated by reference, the PSS specifies one of three values (0, 1, 2) to identify the cell's physical layer identity, and the SSS identifies which one of the 168 groups the cell belongs to. In this way it is only necessary for PSS to express one of three values whilst SSS expresses one of 168 values. PSS is a 62-bit signal based on a Zadoff-Chu sequence, and SSS uses a combination of two 31-bit sequences which are scrambled by use of a sequence derived from the physical cell identity. Both PSS and SSS are transmitted in fixed resources by all cells so that they can be detected by any UE within range of the signal. Conventionally, each of the PSS and SSS is transmitted twice per frame, in other words with a 5 ms periodicity (and consequently, only in some subframes). For example, PSS and SSS are both transmitted on the first and sixth subframe of every frame as shown in FIGS. 5A and 5B. FIG. 5A shows the structure of PSS AND SSS and PBCH in the case of an FDD system (using a normal CP), and FIG. 5B shows the same thing in the case of TDD.

Successfully decoding the PSS and SSS allows a UE to obtain timing and identity for a cell. Once a UE has decoded a cell's PSS and SSS it is aware of the cell's existence and may decode the MIB in the PBCH referred to earlier. Depending on whether the system is using FDD or TDD, PBCH occupies the slots following or preceding PSS and SSS in the first subframe, as can be seen by comparing FIG. 5A and FIG. 5B. Like the synchronization signal SSS, PBCH is scrambled using a sequence based on the cell identity. The PBCH is transmitted every frame, thereby conveying the MIB over four frames.

The UE will then wish to measure the cell's reference signals (RSs). For current LTE releases, the first step is to locate the common reference signals CRS, the location in the frequency domain of which depends on the PCI. Then the UE can decode the broadcast channel (PBCH). In addition, the UE can decode PDCCH and receive control signalling. In particular, in the case of Transmission Mode 9, the UE may need to measure the radio channel using the Channel State Information RS (CSI-RS) mentioned above.

Having synchronized with the network and decoded the MIB, UE will also need to obtain some uplink transmission resource for sending its data to the network.

The Physical Random Access Channel PRACH is used to carry the Random Access Channel (RACH) for accessing the network if the UE does not have any allocated uplink transmission resource. If a scheduling request (SR) is triggered at the UE, for example by arrival of data for transmission on PUSCH, when no PUSCH resources have been allocated to the UE, the SR is transmitted on a dedicated resource for this purpose. If no such resources have been allocated to the UE, the RACH procedure is initiated. The transmission of SR is effectively a request for uplink radio resource on the PUSCH for data transmission.

Thus, RACH is provided to enable UEs to transmit signals in the uplink without having any dedicated resources available, such that more than one terminal can transmit in the same PRACH resources simultaneously. The term "Random Access" (RA) is used because (except in the case of contention-free RACH, described below) the identity of the UE (or UEs) using the resources at any given time is not known in advance by the network (incidentally, in this specification the terms "system" and "network" are used interchangeably). Preambles (which when transmitted, produce a signal with a signatures which can be identified by the eNodeB) are employed by the UEs to allow the eNodeB to distinguish between different sources of transmission.

RACH can be used by the UEs in either of contention-based and contention-free modes.

In contention-based RA, UEs select any preamble at random, at the risk of "collision" at the eNodeB if two or more UEs accidentally select the same preamble. Contention-free RA avoids collision by the eNodeB informing each UE which preambles may be used.

Figure 6:
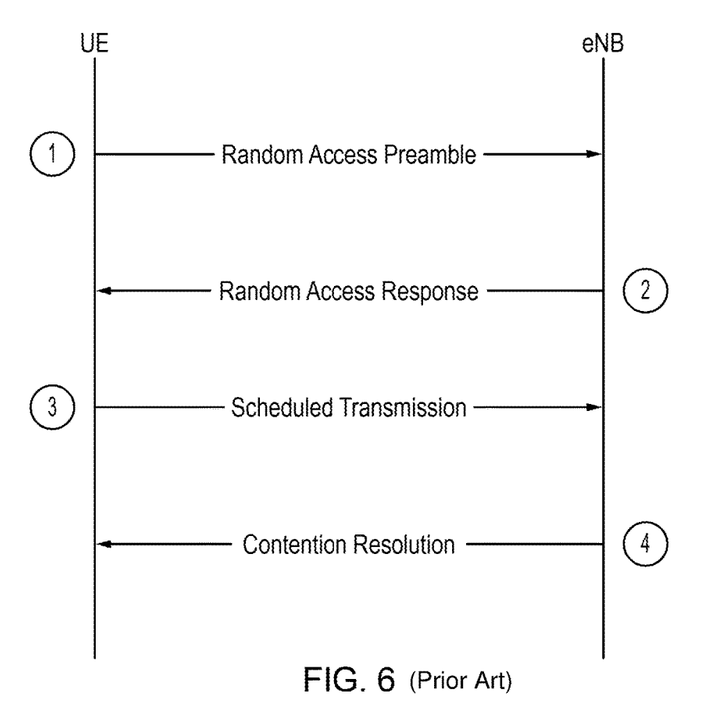
FIG. 6 shows a conventional RACH procedure in an LTE system.

Referring to FIG. 6, the Physical Random Access Channel PRACH typically operates as follows (for contention based access):—

(i) As already mentioned the UE10 receives the downlink broadcast channel PBCH for the cell of interest (serving cell).

(ii) The network, represented in FIG. 6 by eNodeB 20, indicates cell specific information including the following:
    resources available for PRACH
    preambles available (up to 64)
    preambles corresponding to small and large message sizes.

(iii) The UE selects a PRACH preamble according to those available for contention based access and the intended message size.

(iv) The UE 10 transmits the PRACH preamble (also called "Message 1", indicated by (1) in the Figure) on the uplink of the serving cell. The network (more particularly the eNodeB of the serving cell) receives Message 1 and estimates the transmission timing of the UE.

(v) The UE 10 monitors a specified downlink channel for a response from the network (in other words from the eNodeB). In response to the UE's transmission of Message 1, the UE 10 receives a Random Access Response or RAR ("Message 2" indicated by (2) in FIG. 6) from the network. This contains an UL grant for transmission on PUSCH and a Timing Advance (TA) command for the UE to adjust its transmission timing.

(vi) In response to receiving Message 2 from the network, the UE 10 transmits on PUSCH ("Message 3", shown at (3) in the Figure) using the UL grant and TA information contained in Message 2.

(vii) As indicated at (4), a contention resolution message may be sent from the network (in this case from eNodeB 20) in the event that the eNodeB 20 received the same preamble simultaneously from more than one UE, and more than one of these UEs transmitted Message 3.

If the UE does not receive any response from the eNodeB, the UE selects a new preamble and sends a new transmission in a RACH subframe after a random back-off time.

As already mentioned, cells may be overlapping or even entirely contained within a larger cell. This is particularly the case for so-called Heterogeneous Networks.

Figure 7:
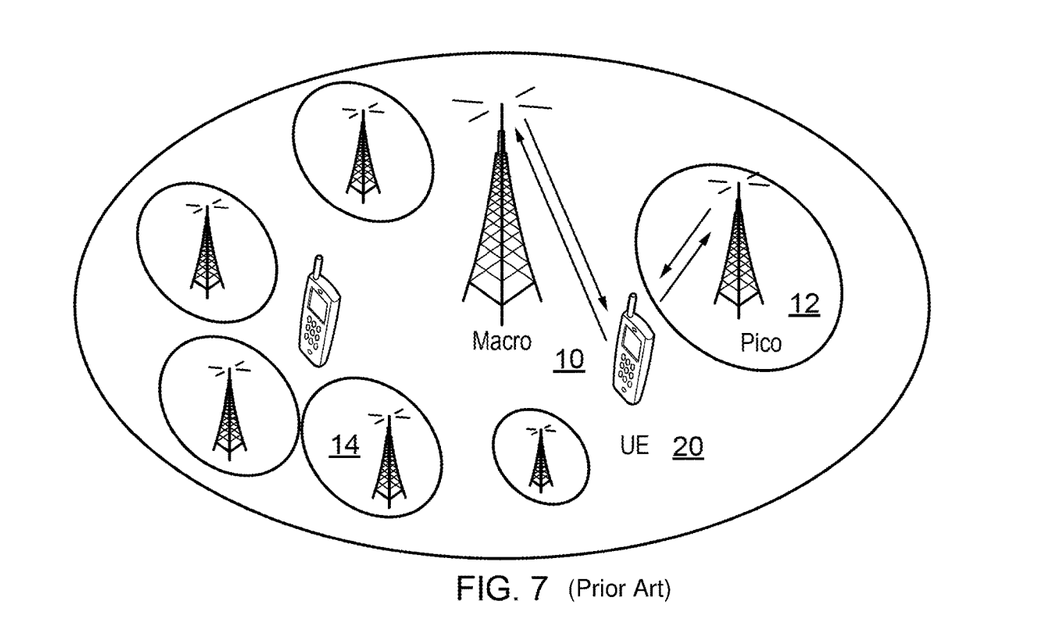
FIG. 7 schematically illustrates a heterogeneous network in which a macro cell, pico and femto cells are overlapping.

FIG. 7 schematically illustrates part of a heterogeneous network in which a macro base station 10 covers a macro cell area MC, within which there are other, overlapping cells formed by a pico base station 12 (picocell PC) and various femto base stations 14 (forming femto cells FC). As shown a UE 20 may be in communication with one or more cells simultaneously, in this example with the macro cell MC and the picocell PC. The cells may not have the same bandwidth; typically, the macro cell will have a wider bandwidth than each pico/femto cell.

Some definitions are as follows:
Heterogeneous Network: A deployment that supports a mixture of more than one of macro, pico, femto stations and/or relays in the same spectrum.
Macro base station—conventional base stations that use dedicated backhaul and open to public access. Typical transmit power ~43 dBm; antenna gain ~12-15 dBi.
Pico base station—low power base station with dedicated backhaul connection and open to public access. Typical transmit power range from ~23 dBm-30 dBm, 0-5 dBi antenna gain;
Femto base station—consumer-deployable base stations that utilize consumer's broadband connection as backhaul; femto base stations may have restricted association. Typical transmit power<23 dBm.
Relays—base stations using the same radio spectrum for backhaul and access. Similar power to a Pico base station.

In LTE, an example of a femto base station is the so-called Home eNodeB or HeNB.

The installation by network customers of base stations with a localised network coverage cell, such as femto base stations (Home eNodeBs) is expected to become widespread in future LTE deployments. A femto base station or pico base station can be installed in, for example, a building within which network subscriber stations experience high path loss in transmissions with a macro cell. Femto and pico base stations can be installed by a customer in his own premises. The femto and picocells thereby formed can improve network coverage, but for coordination among the various cells, it is preferable for all the femto and picocells to be under the control of the macro cell (more precisely the MeNB 10 of FIG. 7), and synchronized with one another. When organized in this way, picocells can be regarded as transmission points of the base station, in addition to transmission points provided by the antenna ports of the base station itself.

The above-mentioned transmission points (TPs) include, for the purposes of the present disclosure both picocells and different sets of antennas within a macrocell at different geographical locations.

At present, a UE and an LTE network are only able to exchange information regarding the coverage of the network once the UE is at least connected to the network at the RRC level (although the UE may be in the RRC_IDLE state). A UE is not able to indicate its presence to the network ahead of an immediate need to transmit UL data, and the network must consistently maintain the transmission of certain broadcast signals (notably PSS/SSS and PBCH) whether they are useful to UEs in the vicinity or not. Such an architecture is not flexible to the changing UE distribution over time, and furthermore current network designs rely on a fixed association of transmission points (TPs) to cells. To provide dynamic deployment flexibility, efficient use of network transmit-power and to manage interference, it is necessary in future network architectures to allow the network to form or be configured dynamically around UEs as they move and as their service needs change over time.

SUMMARY OF THE INVENTION

According to a first aspect of the present invention, there is provided a transmission method for use in a wireless communication system comprising at least one terminal and at least one base station controlling at least two transmission points which may each be controlled to broadcast a first signal, wherein:
 one of the transmission points broadcasts the first signal;
 the terminal discovers the transmission point by receiving the first signal broadcast from the transmission point;
 the terminal thereafter transmits a second signal with at least one characteristic which depends on at least one characteristic of the received first signal; and
 the base station, upon a transmission point receiving the second signal from the terminal, enables a third signal to be broadcast from at least one transmission point.

Here, the second signal transmitted by the terminal may be regarded as a "presence indication", and is so referred to in the detailed description which follows. This presence indication allows the terminal to autonomously indicate to the network which transmission points it can receive signals from. In embodiments of the present invention, the presence indication signals to the base station that the relevant transmission point should begin broadcasting the third signal.

In an embodiment, the at least one characteristic of the first signal comprises a synchronization sequence which carries an identifier of the transmission point.

Alternatively, or in addition, the at least one characteristic of the first signal comprises the timing with which the first signal was broadcast.

Alternatively, or in addition, the at least one characteristic of the first signal implies a frequency and/or a list of possible transmission timings (transmission schedule) for the second signal. Then, preferably, the terminal transmits the second signal autonomously at any timing permitted by the list of possible transmission timings.

The at least one characteristic of the second signal, which depends on at least one characteristic of the received first signal, may comprise any of: one or more timings at which the second signal may be transmitted; and one or more frequencies on which the second signal may be transmitted.

The above timings may for example be distinct subframes within a frame-based wireless communication system. Receiving the first signal from a transmission point in a specific first subframe may imply that the terminal can send the second signal in a second subframe having a predetermined relationship to the first subframe.

The second signal may have a further characteristic including one or more of a configuration of a sounding reference signal and a selection of a random access preamble. In this way, a terminal receiving a specific first signal may, in response, transmit a sounding reference signal according to a predetermined configuration, or transmit a random access preamble having an implicit meaning for the network. By combining both kinds of signal (sounding reference signal and random access preamble), the terminal may signify any of a potentially large number of possible states—in other words, information about the terminal or its preferences—to the network.

There are several possible kinds of information which the terminal may wish to impart to the network. In any of the methods so far defined, a characteristic of the second signal may imply at least one of: a preferred status of the transmission point among a plurality of transmission points discovered by the terminal; and a preference for receiving transmissions from a particular plurality of transmission points from among those discovered by the terminal. This latter kind of preference is referred to below as the terminal's aggregation preference.

The third signal, broadcast in response to receiving the second signal, can include any one or more of a broadcast channel, a paging channel, a reference signal, and a synchronization sequence. This allows transmission power to be saved at the transmission points, by broadcasting the third signals only when necessary (for example, when one or more terminals are present).

When the third signal is (or comprises) a reference signal or a synchronization signal, it may be broadcast with a density which depends on receiving the second signal and/or a characteristic of the second signal. In this way the extent, rather than just on/off condition of the third signal can be controlled, for example to suit terminals having differing requirements with respect to reference or synchronization signals. The third signal may be broadcast on a different frequency from the first signal.

In any of the methods so far defined, the steps of the method may be repeated for a plurality of transmission points controlled by the base station and discovered by the terminal. In other words the terminal may transmit a respective second signal towards, or with respect to, a plurality of transmission points which it has discovered. It is not essential, however, for the terminal to send a second signal in respect of every transmission point which it discovers.

In one embodiment of the method, the terminal is only permitted to transmit the second signal when it receives the first signal from the transmission point but does not receive a specified additional signal from that transmission point. This avoids, for example, unnecessarily signalling to the transmission point that it begin transmitting the specified additional signal, if it is already doing so.

In a further embodiment, the terminal is only permitted to transmit the second signal when there is a change in the transmission points from which it receives the second signal, in other words a change in the discovered set of transmission points from which it receives the first signal.

A still-further embodiment is applicable to a wireless communication system in which the transmission points provide different cells for uplink and downlink. The second signal from the terminal is transmitted in the uplink of one cell but at a timing based on the downlink timing of another cell.

According to a second aspect of the present invention, there is provided a transmission method for use in a wireless communication system comprising at least one terminal and a network controlling at least two transmission points, wherein:

the network controls a first transmission point to transmit a first broadcast signal;

the terminal is configured to, upon reception of the first broadcast signal, transmit an uplink signal with at least one characteristic which depends on at least one characteristic of the received first broadcast signal; and the network, upon reception of the uplink signal from the terminal, enables a second broadcast signal to be transmitted from a second transmission point.

According to a third aspect of the present invention, there is provided a transmission method for use in a wireless communication system comprising at least one terminal and a network controlling a transmission point, wherein:

the network controls the transmission point to transmit a first broadcast signal;

the terminal is configured to, upon reception of the first broadcast signal, transmit a first uplink signal with at least one characteristic which depends on at least one characteristic of the received first broadcast signal;

the network, upon reception of the first uplink signal from the terminal, enables a second broadcast signal to be transmitted from the transmission point; and the terminal, upon reception of the second broadcast signal, transmits a second uplink signal with at least one characteristic which depends on at least one characteristic of the received second broadcast signal.

Another aspect of the present invention provides a wireless communication network arranged to perform any method as defined above.

An additional aspect of the present invention provides a base station configured for use in any transmission method as defined above.

An additional aspect of the present invention provides a terminal configured for use in any transmission method as defined above.

A further aspect relates to software for allowing wireless transceiver equipment equipped with a processor to provide the terminal or the base station as defined above. Such software may be recorded on a computer-readable medium.

Throughout this section and the claims, the term "cell" is intended also to include sub-cells.

Embodiments of the present invention provide a new way for a UE to autonomously indicate to the network from which transmission points (TPs) it is able to receive certain broadcast signals. As an example, by receiving in a broadcast signal in the form of a synchronization sequence, the physical identity of a particular TP, a UE infers when it should, if it wishes, send on an UL an indication of its ability to receive the broadcast signal from that TP—i.e., an indication of its presence in the coverage of the TP. The network is then able to take suitable action in response to this, such as adjusting network coverage, enabling or disabling other broadcast channels and controlling paging.

Advantages of embodiments of the present invention may include any of the following:—

The terminal (UE) does not need to know any explicit timing information in order to receive the broadcast signal and transmit a response If multiple UEs indicate their presence simultaneously, there is no need for contention resolution (in contrast to RACH)

The possibility of a response by the network to the UE transmission of the presence indication signal, in the form of activating additional broadcast channels Less transmission overhead and/or signalling are needed in order for the network to establish the presence of terminals within the coverage/service area of particular transmission points In general, and unless there is a clear intention to the contrary, features described with respect to one embodiment of the invention may be applied equally and in any combination to any other embodiment, even if such a combination is not explicitly mentioned or described herein.

As is evident from the foregoing, the present invention involves signal transmissions between base stations and user equipments in a wireless communication system. A base station may take any form suitable for transmitting and receiving such signals. It is envisaged that the base stations will typically take the form proposed for implementation in the 3GPP LTE and 3GPP LTE-A groups of standards, and may therefore be described as an eNodeB (eNB) (which term also embraces Home eNodeB or Home eNodeB) as appropriate in different situations. However, subject to the functional requirements of the invention, some or all base stations may take any other form suitable for transmitting and receiving signals from user equipments, and for adapting signals for transmission to user equipments based on fed back channel state information.

Similarly, in the present invention, each user equipment may take any form suitable for transmitting and receiving signals from base stations. For example, the user equipment may take the form of a subscriber station, or a mobile station (MS), or any other suitable fixed-position or movable form. For the purpose of visualising the invention, it may be convenient to imagine the user equipment as a mobile handset (and in many instances at least some of the user equipments will comprise mobile handsets), however no limitation whatsoever is to be implied from this.

BRIEF DESCRIPTION OF THE DRAWINGS

Reference is made, by way of example only, to the accompanying drawings in which.

DETAILED DESCRIPTION

The principal scenario envisaged here is a UE operating among a large collection of TPs which may have no particular network structure to them (in the sense of not necessarily being associated with particular cells). Some higher-level entity such as a macro-eNodeB (MeNB) may be controlling the TPs, or control may be held elsewhere. In any case, synchronization between the TPs is assumed. If a UE were able to obtain information about the structure of the network directly from broadcast signalling intended for multiple UEs, it would be able to make decisions about its interaction with the network without needing to receive potentially large amounts of higher-layer signalling describing the particular resources available to it in a dense, complex, multi-frequency-layer scenario. Such a problem is considered in international patent application PCT/EP2012/051452. However, if the UE were further able to autonomously act on that information by indicating to the network which TPs it is within reception of, the network (or TPs) would be able to react accordingly in terms of coverage and resource provision.

The principal scenario is not limiting: for the purposes of this invention, both pico cells and different sets of antennas within a cell at different geographical locations can be considered as TPs, and a notable alternative scenario is that of a densely-deployed layer of pico-cells under the control of an overlaid macro-cell.

This invention designs a means for a UE to autonomously indicate to the network which TPs it is able to receive signals from. This is called "presence indication" below. Applied to LTE, by receiving at the primary and secondary synchronization sequences (PSS and SSS) from a TP, and matching the physical cell identity (PCI) they carry to a lookup table, a UE infers when it should, if it wishes, send on an UL an indication of its ability to receive the broadcast signal—i.e., an indication of its presence in the coverage of the TP (below, "presence indication"). Reference is made below to sending such a presence indication "to" a TP, but it will be understood that this is shorthand for the UE transmitting a signal to the network with respect to a given TP, as not all TPs are necessarily equipped to receive signals from UEs.

In what follows, the identity conveyed by the synchronization sequence(s) is referred to as the 'physical transmission point identity' (PTPI) to distinguish the fact that the TP may not be transmitting all (or any) of the signals typically associated with forming the basis for a cell in LTE; and to make clear that new synchronization sequence(s) may be used which carry a physical identity different to the classical PCI. That is, the invention may be deployed using new versions of PSS and/or SSS which carry an identifier which is not necessarily the PCI, but nevertheless in some way identifies the TP. This is to provide backwards compatibility with legacy UEs which are unaware of the methods in this invention. Thus, the following description refers mainly to 'synchronization sequences' (SSs) rather than to PSS and SSS.

Figure 8:
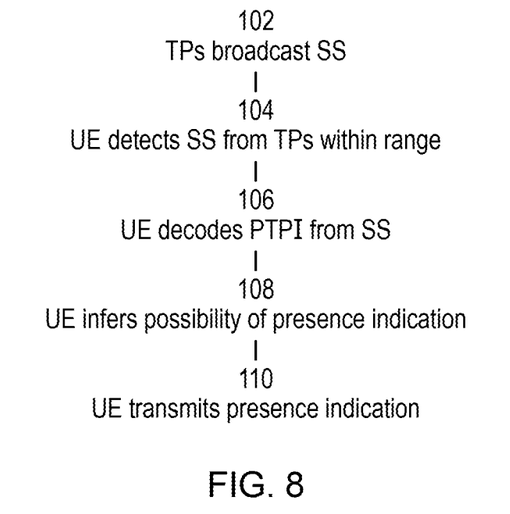
FIG. 8 is a flowchart of the main steps involved in a method embodying the invention.

FIG. 8 outlines the process flow in methods embodying the invention.

In step 102, TPs broadcast their SSs, which may be the conventional PSS/SSS of an LTE network as already mentioned, and which contain in some way the PTPI of the respective TP, for example a conventional PCI. As already mentioned, conventional PSS/SSS are constructed from bit sequences which are scrambled by use of a sequence derived from the PCI. A similar approach can be assumed for constructing any novel SS.

In step 104, a UE detects the SSs from as many TPs as it is currently in range of.

Then, in step 106, the UE decodes each received SS in order to derive the PTPI carried thereby. Thus, in the case of the conventional PSS/SSS, successful decoding allows the UE to determine the cell PCI used for scrambling the sequences used to form the PSS/SSS.

In step 108, the UE infers some information about the possibility of transmitting its own presence indication in response to the SS, such as available timings (and possibly one or more frequencies) for sending a presence indication on the UL associated with the relevant TP. In the case just mentioned, this inference is based on the value of the PTPI, such as its numerical index within a table of possible values.

In step 110, the UE decides to send such a presence indication, and does so. As will become clear from the discussion of embodiments below, this presence indication need not be a single transmission but can include a combination of signals. The specific timing (within a set or range of available timings) chosen for transmission of the presence indication may signify additional information to the network.

Steps 106 to 110 have been described in relation to a single SS, but could in principle be repeated for as many SSs as are detected by the UE, with step 110 being optional.

UEs may take further autonomous decisions regarding presence indications before sending them, and the network is then able to take suitable action in response, such as adjusting network coverage and structure, enabling or disabling other broadcast channels and controlling paging signals.

An alternative way of initiating the invention is to use the association of PSS/SSS to a subframe, as disclosed in international patent application PCT/EP2012/051452, to link the subframe in which the UE receives PSS/SSS from a TP to the subframe in which it may transmit a presence indication. Thus, the value of the PTPI is not necessarily required in order for the UE to infer the possible timing of a presence indication.

In general, unless otherwise indicated, the embodiments described below are based on LTE, where the network operates using FDD and comprises one or more eNodeBs/MeNBs, each controlling one or more downlink cells, each downlink cell having a corresponding uplink cell. Each DL cell may serve one or more terminals (UEs) which may receive and decode signals transmitted in that serving cell. In current systems, during normal operation, each cell transmits a number of signals and channels in broadcast to all UEs, whether they are being served by the cell or not such as: the PSS, SSS, CRS and PBCH. These convey timing information, PCI, and other essential system information common to the cell. Other information is transmitted to UEs being served by the cell, on channels including PDCCH. A PDCCH message typically indicates whether the data transmission will be in the uplink (using PUSCH) or downlink (using PDSCH), it also indicates the transmission resources, and other information such as transmission mode, number of antenna ports, data rate, number of codewords enabled. In addition PDCCH may indicate which reference signals may be used to derive phase reference(s) for demodulation of a DL transmission. Reference signals for different antenna ports, but occupying the same locations, are distinguished by different spreading codes.

However, in the context of LTE, the operation of the present invention does not require the network to be transmitting any signals and channels except PSS and/or SSS, or equivalent SSs.

(a) UE presence indication by SRS transmission

In a first embodiment, the set of participating TPs transmit their SSs carrying PTPIs. Each PTPI is characteristic of a particular TP, although each TP is not necessarily restricted to a single PTPI. Other broadcast signals are not necessarily transmitted. A UE which is able to receive a particular PTPI can treat this as permission to transmit SRS according to a given configuration in a particular subframe number m, thus indicating its presence to the network. A set of UE-specific SRS configurations could be reserved in specifications to be used for this purpose as distinct from the convention UL channel sounding usage of SRS. Multiple UEs transmitting in the same UE-specific SRS configuration could be distinguished by having different cyclic shifts on their SRS sequences. However, it may not be necessary for the network to be able to identify exactly how many UEs have indicated their presence at a given moment.

In the case that the SSs are in fact the LTE PSS and SSS carrying the classical PCI, this amounts to assigning certain among the PCIs to the function of indicating subframe numbers permitted for UE presence indication transmission.

This embodiment serves the dual purposes of (i) allowing the UE to indicate its proximity to a particular TP to the network and (ii) to provide UL channel quality information regarding that TP (which may or may not make actual use of it).

In a variation on this embodiment, in a scenario of having a macrocell overlay on a densely-deployed set of unstructured TPs, the macro-eNodeB can signal the reserved SRS configurations over RRC and can change them according to its needs (for example, the MeNB's conventional sounding needs. Appropriate allocation of SRS resources will also depend on how many active UEs are within the coverage area of the macro cell).

(b) UE presence indication by PRACH transmission

A second embodiment is like the first, except that permission is given to the UE for a transmission on PRACH. To distinguish conventional uses of PRACH from this invention, a subset of the RA preambles could be reserved to be used for this purpose. In the case of a UE operating in a scenario of not having an RRC connection to the network and/or no access to PBCH transmissions (see later embodiments), a portion of PRACH resources could be reserved in specifications for transmission of similarly reserved RA preambles for the purpose of this invention. On receiving a RA preamble relevant to this embodiment, the network does not engage in the usual RA procedure, but may instead follow a course of action such as those described in the following embodiments.

If more than one UE selects the same preamble in this embodiment, they will simply both be received by the network in the same subframe. This will 'hide' the true quantity of UEs but will still provide an indication that there is at least one UE present.

In a variation on this embodiment, in a scenario of having a macrocell overlay on a densely-deployed set of unstructured TPs, the macro-eNodeB can signal the reserved PRACH resources and preambles over RRC and can change them according to its needs.

Partitioning of preambles into subsets is explored further in the applicant's co-pending international patent applications PCT/EP2011/067048 and PCT/EP2012/051144, hereby incorporated by reference.

(c) UE presence indication by joint SRS and PRACH transmission

In a third embodiment, the first and second embodiments are combined so that a UE indicates its presence by transmitting SRS in one particular subframe m1 and also on PRACH in subframe m2. m1 and m2 may be equal or unequal, and m2 may be a function of m1, or vice-versa.

If the SRS and PRACH provide the same presence indication redundantly, reliability of detection of the UE's presence indication is increased.

On the other hand, the presence indication may be constituted by the combination of the SRS and PRACH rather than by either one individually. Such a combination of signals permits a larger number of possible states to be signalled, for example to allow a larger number of UEs to be distinguished, or to indicate additional information along the lines stated below for the fourth embodiment.

(d) Multiple UL subframe grants for UE indication

In this fourth embodiment, the subframe number m in the preceding embodiments is extended to allow multiple subframes {m1, m2, . . . } in which a UE may transmit the signal representing a presence indication. The UE's choice of which particular subframe is used indicates information to the network about the UE's view of the TP such as:

Preferred status of the TP among those being received. For example, a 'high' preference would indicate that (i) the UE can receive the TP and (ii) that among those it can receive it would prefer further transmissions on, e.g., PDSCH from this one; while a 'low' preference would indicate that (i) the UE can receive the TP but (ii) it will be sending 'high' preference indications to at least one other TP. Such information can aid scheduling decisions either at TPs or at higher aggregation levels, such as an eNodeB (see above).

TP aggregation preference. For example, the UE would have a high preference for further transmissions on, e.g., PDSCH from this TP in conjunction with at least one other, the choice of subframe indicating the other TP(s). The aggregation of TPs may be into an antenna port (in LTE terminology) or some other transmission arrangement. One choice of subframe could indicate that the UE prefers this TP alone.

These preferences may be based on measurements of the received power level of the PSS and/or SSS from TPs. Depending on how many subframes the UE is granted the choice of, a number of states may be indicated. This embodiment may be combined with the third embodiment to permit more states to be indicated.

In a variation on this embodiment, the UE is permitted to transmit in as many of the offered subframes as it chooses, the pattern or quantity of subframes so used indicating the state as above.

(e) Multi-frequency presence indication

A fifth embodiment is like any of the preceding embodiments, except that permission is given to the UE to transmit a presence indication to a TP on an uplink frequency different to the uplink frequency of the uplink associated with the SS carrying the PTPI which was received by the UE. This allows a TP to restrict its availability to UEs which are capable of transmitting in a particular band, or to direct a UE's presence indications to a TP which is receiving the other frequency.

In a variation, the UE is permitted to transmit presence indications on more than one frequency simultaneously, such as a primary and a secondary LTE carrier provided by a TP, or by separate TPs (without limitation to any particular number of carriers, frequencies or TPs). This variation would be likely to prefer configuration by RRC from a pre-existing connection rather than by specification to avoid unnecessary mandatory multi-carrier presence indications from UEs. This could also allow a TP to change over time the frequency band on which the PTPI is transmitted depending on factors such as the prevailing load on each frequency and TP.

Figure 9:
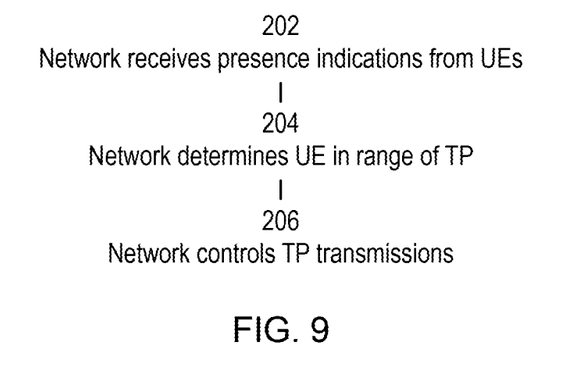
FIG. 9 is a flowchart of a network response to UE presence indications in certain embodiments of the invention.

FIG. 9 outlines the possible response of the network to UEs' transmission of presence indications.

In a step 202, the network receives each presence indication transmitted by UEs in accordance with any of the earlier embodiments.

In step 204, the network collates the presence indications with the transmission points towards which, or with respect to which they were sent. This enables the network to determine whether any UEs are currently receiving signals from a given TP and if so, at least roughly how many.

In step 206, the network controls the TP appropriately in response to this determination. For example the TP may be controlled to turn on, or off any of a paging channel, broadcast channel or reference signals.

The following sixth to ninth embodiments give examples of this process.

(f) Paging/Tracking Area restriction

In a sixth embodiment, on receiving presence indications for a UE at a number of (at least one) TPs, the network can use this to manage the transmission of the Paging Channel (PCH) so as to restrict physical transmission on it to the area local to the TPs at which the relevant presence indications were received. Here, to restrict physical transmission means, for example, to select a set of TPs for transmission of PCH to be those which are geographically close to a location at which a presence indication was received, assuming that the TPs have receivers or are associated with a nearby receiver. This embodiment avoids unnecessary transmission of PCH from TPs for which it is known (or it can be assumed) that there are no nearby UEs. This information could also be used by higher layers to provide the UE with a tracking area update.

(g) PBCH transmission restriction

In this seventh embodiment, TPs do not necessarily by default transmit PBCH. On receiving presence indications for a UE at a number of (at least one) TPs, the network activates transmission of PBCH from at least some among those TPs. At a later time, when the network is no longer receiving presence indications to the relevant TPs, it can stop their PBCH transmissions. The advantages of this are that wasted transmission power is reduced and inter-cell interference on PBCH is reduced.

In this way, the network does not necessarily transmit PBCH from a given TP unless it identifies that there is likely to be a UE in the vicinity which can receive the PBCH.

PSS and SSS transmission restriction (h) An eighth embodiment is like the seventh except that TPs do not necessarily transmit even PSS and SSS by default. In this embodiment, the UE is presently in an area where PSS and SSS are available and at least the first, second or third embodiments of this invention are in use. As the UE moves, the network is able to estimate its direction of motion on the basis of which TPs stop receiving presence indications from the UE, and the network can thus activate PSS and SSS in geographical areas it judges the UE is likely to be moving towards.

In this way, the network does not necessarily transmit PSS/SSS from a given TP unless it identifies that there is likely to be a UE in the vicinity which can receive the PSS/SSS. Thus, the preceding embodiments of this invention become operational in those areas and meanwhile transmission power is saved.

(i) CRS transmission restriction

A ninth embodiment is like the eighth, but transmission of cell-specific reference signals (CRS) from particular TPs is controlled in similar manner to that in the preceding embodiments, according to which TPs the network receives UE presence indications at, thereby preventing unnecessary transmission of CRS.

(j) UE permission control by PBCH presence

In a tenth embodiment, a UE does not by default have permission to engage in the process described in earlier embodiments. Instead, a UE is only permitted to send presence indications to TPs from which it does not detect PBCH transmissions but does detect PSS/SSS transmissions. In this way, a TP that is already active does not receive unnecessary signalling implying it should begin transmissions and a UE is not required to send them saving transmit power and reducing interference on PRACH or SRS.

In a variation, the UE transmission proposed under the invention is inhibited by the UE detecting reference signals such as CRS (rather than PBCH).

By contrast, conventionally, where TPs are co-located, forming a conventional cell, at least some of the TPs will always send PSS/SSS, CRS and PBCH, whether or not any UEs are known or thought to be present in the cell.

(k) UE permission control by SS reception change

In an eleventh embodiment, like in the tenth, the UE does not by default have permission to engage in the process described in earlier embodiments. Instead, a UE is only permitted to send presence indications to TPs when there is a change in the set of SSs it is able to receive. In this way, a UE does not transmit unnecessary presence indications when its view of the network has remained unchanged.

(l) Presence indication resource provision by SS—subframe association

A twelfth embodiment is like any of the preceding embodiments, except that the set of participating TPs transmit their SSs on a certain subframe-based schedule, this schedule being co-ordinated among the TPs at least within a given geographical area. A UE which is able to receive SSs from a particular TP in subframe n can treat this as permission to transmit SRS according to a given configuration in subframe m, a function of at least n. The basic principle of this embodiment is related to an embodiment of the applicant's co-pending international patent application PCT/EP2012/051452, hereby incorporated by reference.

(m) UE synchronization refinement

LTE-A Rel-11 will introduce a 'new carrier type' (NCT) which may not be backwards compatible with Rel-10 and earlier carriers. The network may provide a UE with both a legacy carrier and a new carrier, and at least in some circumstances it will be necessary for the UE to acquire synchronization on the new carrier separately from the legacy carrier in such a situation. The "legacy carrier" is a carrier suitable for use with Rel-10 and earlier UEs, which below are referred to as legacy UEs.

In a thirteenth embodiment, a TP transmits PSS/SSS separately on the NCT and on the legacy carrier. A UE is able to obtain coarse synchronization on the NCT using its PSS/SSS, but after receiving a presence indication from a UE on a legacy carrier, the network enables, e.g. CRS or CSI-RS transmission on the NCT which the UE can use to refine its synchronization to the NCT.

The conventional RACH procedure (see FIG. 6) can be regarded as a form of presence indication, so in a variation, a UE can execute the conventional RACH procedure on the NCT, thus obtaining coarse timing and effectively providing a presence indication on the NCT, following which RS or CSI-RS, etc., can be enabled on the NCT to allow finer timing to be obtained.

The difference from conventional RACH is that, here, the RACH procedure does not require the UE to receive CRS or PBCH on the new carrier. Rather, CRS and/or PBCH on the new carrier is activated following RACH. The system information (MIB) which the UE normally receives via PBCH prior to RACH would be sent by some other means. The UE can receive this information from, for example, signalling on the legacy carrier.

(n) Expandable Reference Signals on UE presence indication

In this fourteenth embodiment, the presence indication is used to control the extent, rather than just the on/off transmission, of reference signals. For example, no timing/reference signals or a sparse configuration of timing/reference signals (PSS/SSS and/or CRS and/or CSI-RS) are transmitted by default on the NCT. When a UE indicates its presence on either a legacy carrier or the NCT, the default configuration is increased in time and/or frequency density to aid UE synchronization on the NCT. The same principle can also be applied to the legacy carrier(s), subject to the system specifications.

In the case of CRS, this could be realised by limiting their transmission in the default case to. e.g., the central 6 RBs of the system bandwidth and possibly by applying a subframe configuration also, so that they are not transmitted in every subframe. When the UE presence indication is received, the density in time and/or frequency as appropriate is increased, possibly all the way to the Release 8 specifications (that is, between 8 and 24 REs per cell per RB reserved for CRS). Once the UE is sufficiently tightly synchronized, the CRS may be reduced in density once again.

Under this embodiment the network may control the presence of PSS/SSS and/or CRS and/or CSI-RS on the NCT in order to meet the requirements of UEs of a particular Release. For example a Release 8 UE would require a full set of PSS/SSS and CRS.

Similar principles apply to the transmission of CSI-RS, except that the eNodeB could configure an additional CSI-RS subframe configuration to the default one, rather than necessarily replacing it (LTE-A Release 11 is likely to permit more than one non-zero-power CSI-RS pattern to be configured for a UE).

(o) Reconfiguration from NCT to Legacy Carrier

In a fifteenth embodiment, the TP is configured such that all carriers are the NCT. If a TP receives a presence indication from a legacy UE, identified by the UE choosing, or being limited to choosing, from a particular subset of the parameter(s) being used for presence indication in the first through fourth embodiments (for example, a particular RA preamble from among the presence indication set), the TP can temporarily re-configure its transmissions of relevant reference signals and/or synchronization signals to provide a legacy carrier.

(p) Presence Indication on one cell based on timing of another cell

A sixteenth embodiment can be based on any of the preceding embodiments, applied where a cell has different resources for uplink and downlink, and the UE is configured with more than one serving cell, each with different uplink resources. The presence indication can be transmitted in the uplink of one cell, but with timing based on the downlink timing of another cell. Applied to LTE, the UE is configured with a Pcell and an Scell. The network may request the UE to transmit PRACH on the Scell uplink, based on the downlink timing of the Pcell, or alternatively based on the current timing of uplink transmissions on the Pcell. Such a "request" need not be explicit, and could include the network simply enabling transmission of the presence indication. The UE has some autonomy in this situation with respect to timing of the presence indication. Operation of the Scell in "UL-only" can be supported, but would require any response to the PRACH on the Scell to be sent on the Pcell.

An additional feature of this embodiment is that the network can determine from the presence indication (in this case PRACH on Scell) whether the timing of two cells (e.g. Pcell and Scell) is sufficiently close for the assumption of synchronization based on the timing of only one of them to be applied, at least for this UE. Otherwise, if the assumption of the synchronization cannot be maintained, the network can provide suitable signals (e.g. PSS/SSS, CRS) according to the fourteenth embodiment.

Various modifications are possible within the scope of the present invention.

The invention has been described with reference to LTE FDD, but could also be applied for LTE TDD, and to other communication systems such as UMTS.

Reference has been made above to "cells" but these need not correspond one-to-one with base stations or transmission points. Different cells may be defined on the downlink and uplink. Multiple cells may be provided by the same transmission point. The term "cells" is thus to be interpreted broadly and to include, for example, sub-cells or cell sectors.

Although the embodiments illustratively refer to a macrocell and pico antenna ports, this does not constrain the network structures to which the invention could be applied.

The above embodiments may in general be combined, for example to restrict transmission of PBCH and CRS together (seventh combined with ninth embodiment).

The activation and deactivation of transmissions from TPs as described in relevant embodiments may be decided locally at the TP or at some higher level of aggregation such as en eNodeB controlling multiple TPs. Not all TPs receiving presence indications from a UE are required to take part in the method described in an embodiment.

The proposed UE behaviour may be pre-determined by specification or could be configured by higher layer signalling, for example using a previously existing RRC connection.

A UE need not in general send presence indications to all, or any, TPs from which it can receive SS transmissions carrying PTPI. This could be used, for example, to:
  Prevent overloading the network with presence indication signalling
  Provide better information to the network by controlling its presence indications (or, if preferred, lead the network to assume the UE has a particular view of the network which may be different to what it actually has).

For example, a UE which is able to detect signals from multiple TPs may choose to respond to one TP having the strongest signal.

It is possible that some transmissions, such as CRS and PSS/SSS may not be transmitted on the NCT, or that they may be transmitted in a reduced time-frequency density. The principles in the embodiments of this invention can be applied to activate or deactivate such transmissions on the new carrier type as well as on legacy carriers. This is particularly relevant to the fifth embodiment, but would also apply to a combination of the fifth with any of the sixth, seventh, eighth and ninth embodiments.

To summarise, embodiments of the present invention provide a new way for a UE to autonomously indicate to the network from which transmission points (TPs) it is able to receive certain broadcast signals. As an example, by receiving in a broadcast signal in the form of a synchronization sequence, the physical identity of a particular TP, a UE infers when it should, if it wishes, send on an UL an indication of its ability to receive the broadcast signal from that TP—i.e., an indication of its presence in the coverage of the TP. The network is then able to take suitable action in response to this, such as adjusting network coverage, enabling or disabling other broadcast channels and controlling paging.

Advantages of embodiments of the present invention include, firstly, that the UE does not need to know any explicit timing information in order to receive the broadcast signal and transmit a response. This is in contrast to the conventional RACH procedure for example, in which the timing of the initial PRACH transmission from the UE is determined from the downlink timing (established by monitoring PSS/SSS and attempting to decode PBCH), and broadcast signalling of PRACH resources within the SIBs. Also, unlike conventional PRACH, there is no need to resolve collisions if multiple UEs indicate their presence simultaneously.

Embodiments of the present invention also provide the possibility of a response by the network to the UE transmission of the presence indication signal, in the form of activating additional broadcast channels. Less transmission overhead and/or signalling are needed in order for the network to establish the presence of terminals within the coverage/service area of particular transmission points.

In any of the aspects or embodiments of the invention described above, the various features may be implemented in hardware, or as software modules running on one or more processors. Features of one aspect may be applied to any of the other aspects.

The invention also provides a computer program or a computer program product for carrying out any of the methods described herein, and a computer readable medium having stored thereon a program for carrying out any of the methods described herein.

A computer program embodying the invention may be stored on a computer-readable medium, or it may, for example, be in the form of a signal such as a downloadable data signal provided from an Internet website, or it may be in any other form.

INDUSTRIAL APPLICABILITY

Embodiments of the invention provide a more efficient means than possible with the prior art to allow a wireless network to be dynamically constructed and configured according to the distribution of UEs within it. The invention makes the existing cellular architectures much more flexible, and able to respond to changes in coverage needs. This will make more efficient use of capital and operational expenditure in the running of such networks, and more efficient use of the resources the network can provide. More specifically, it allows a UE to indicate to the network about its ability to receive signals from the TPs comprising it without having to establish an RRC connection. This creates a situation where the network may receive information that the UE judges, autonomously, to be relevant without the need for configuration signaling from the network. Such information may have increased pertinence and timeliness compared to information in measurement reports configured solely by the network according to the prior art, thus improving the scheduling and resource efficiency of the system further.

What is claimed is:

1. A transmission method for use in a wireless communication system comprising at least one terminal and at least one base station controlling at least two transmission points which may each be controlled to broadcast a first signal, wherein:

one of the transmission points broadcasts the first signal;

the terminal discovers said transmission point by receiving the first signal broadcast from said transmission point;

the terminal thereafter transmits a discovery indication in the form of a second signal which depends on at least one characteristic of the received first signal; and the base station, in response to receiving the second signal from the terminal, enables a third signal including any one or more of a broadcast channel, a paging channel, a broadcast reference signal, and a synchronization sequence to be broadcast from said transmission point only when one or more terminals are present.

2. The method according to claim 1 wherein the at least one characteristic of the first signal comprises at least one of: a synchronization sequence which carries an identifier of said transmission point; and the timing with which the first signal was broadcast.

3. The method according to claim 1 wherein the at least one characteristic of the first signal implies a frequency and/or a list of possible transmission timings for the second signal.

4. The method according to claim 3 wherein the terminal transmits the second signal autonomously at any timing permitted by said list of possible transmission timings.

5. The method according to claim 1 wherein the at least one characteristic of the second signal which depends on at least one characteristic of the received first signal comprises any of: one or more timings at which the second signal may be transmitted; and one or more frequencies on which the second signal may be transmitted.

6. The method according to claim 1 wherein the second signal has a further characteristic including one or more of a configuration of a sounding reference signal and a selection of a random access preamble.

7. The method according to claim 1 wherein a characteristic of the second signal implies at least one of: a preferred status of said transmission point among a plurality of transmission points discovered by the terminal; and a preference for receiving transmissions from a particular plurality of transmission points from among those discovered by the terminal.

8. The method according to claim 1 wherein the third signal is a reference signal or a synchronization signal and is broadcast with a density which depends on the second signal.

9. The method according to claim 1 wherein the third signal is broadcast on a different frequency from the first signal.

10. The method according to claim 1 wherein the steps of the method are repeated for a plurality of transmission points controlled by the base station and discovered by the terminal.

11. The method according to claim 1 wherein the terminal is only permitted to transmit the second signal when it receives the first signal from said transmission point but does not receive a specified additional signal from said transmission point.

12. A wireless communication system comprising at least one terminal and at least one base station controlling at least two transmission points which may each be controlled to broadcast a first signal, wherein;

one of the transmission points is configured to broadcast the first signal;

the terminal is configured to discover said transmission point by receiving the first signal broadcast from said transmission point;

the terminal is configured thereafter to transmit a discovery indication in the form of a second signal which depends on a least one characteristic of the received first signal; and the base station is configured, in response to receiving the second signal to control said transmission point to broadcast a third signal only when one or more terminals are present, the third signal including any one or more of a broadcast channel, a paging channel, a broadcast reference signal, and a synchronization sequence.

13. A base station configured for use in the transmission method according to claim 1.

14. A terminal configured for use in the transmission method according to claim 1.

* * * * *